(12) United States Patent
Luisi (10) Patent No.: US 7,233,904 B2
(45) Date of Patent: Jun. 19, 2007

(54) MENU-DRIVEN VOICE CONTROL OF CHARACTERS IN A GAME ENVIRONMENT

(75) Inventor: Seth C. H. Luisi, Foster City, CA (US)

(73) Assignee: Sony Computer Entertainment America, Inc., Foster City, CA (US)

( * ) Notice: Subject to any disclaimer, the term of this patent is extended or adjusted under 35 U.S.C. 154(b) by 0 days.

(21) Appl. No.: 11/403,716

(22) Filed: Apr. 13, 2006

(65) Prior Publication Data

US 2006/0190270 A1    Aug. 24, 2006

Related U.S. Application Data

(63) Continuation of application No. 09/859,034, filed on May 14, 2001, now Pat. No. 7,085,722.

(51) Int. Cl.
*G10L 15/18* (2006.01)

(52) U.S. Cl. ............... 704/275; 704/231; 704/270.1; 463/39

(58) Field of Classification Search ............... 704/231, 704/251, 270, 275, 270.1, 246; 463/39; 345/158
See application file for complete search history.

(56) References Cited

U.S. PATENT DOCUMENTS

| | | | |
|---|---|---|---|
| 4,677,569 | A | 6/1987 | Nakano et al. |
| 4,757,525 | A | 7/1988 | Matthews et al. |
| 5,274,560 | A | 12/1993 | LaRue |
| 5,446,714 | A | 8/1995 | Yoshio et al. |
| 5,617,407 | A | 4/1997 | Bareis |
| 5,890,122 | A | 3/1999 | Van Kleeck et al. |
| 6,155,924 | A | 12/2000 | Nakagawa et al. |
| 6,366,272 | B1 | 4/2002 | Rosenberg et al. |
| 6,456,977 | B1 | 9/2002 | Wang |
| 6,529,875 | B1 | 3/2003 | Nakajima et al. |
| 6,538,666 | B1 | 3/2003 | Ozawa et al. |
| 6,554,707 | B1 * | 4/2003 | Sinclair et al. ............... 463/39 |
| 6,571,208 | B1 | 5/2003 | Kuhn et al. |

(Continued)

FOREIGN PATENT DOCUMENTS

CN          1201180       12/1998

(Continued)

OTHER PUBLICATIONS

Aguilera, S. et al., "Impaired Persons Facilities Based on a Multi-Modality Speech Processing System," Proc. on Speech & Language Tech., 1993.

(Continued)

*Primary Examiner*—Richemond Dorvil
*Assistant Examiner*—Huyen X. Vo
(74) *Attorney, Agent, or Firm*—Carr & Ferrell LLP (57) ABSTRACT

In a gaming system, a user controls actions of characters in the game environment using speech commands. In a learning mode, available speech commands are displayed in a command menu on a display device. In a non-learning mode, the available speech commands are not displayed. A speaker-independent context-sensitive speech recognition module contains a vocabulary of available speech commands. Use of speech commands is combined with input from a controller device to control actions of a character or characters in the game environment.

26 Claims, 6 Drawing Sheets

U.S. PATENT DOCUMENTS

| | | | |
|---|---|---|---|
| 6,928,433 | B2 | 8/2005 | Goodman et al. |
| 7,085,722 | B2 | 8/2006 | Luisi |

FOREIGN PATENT DOCUMENTS

| | | |
|---|---|---|
| DE | 199 05 076 | 5/2000 |
| EP | 0 789 296 | 8/1997 |
| EP | 0 850 673 | 7/1998 |
| GB | 2 351 637 | 1/2001 |
| JP | 09-265379 | 10/1997 |
| JP | 11-070273 | 3/1999 |
| JP | 2001-029649 | 2/2001 |
| KR | 2000-72753 | 12/2000 |

OTHER PUBLICATIONS

Arons, B., "Authoring and Transcription Tools for Speech-Based Hypermedia," Proc. of American Voice I/O Society, 1991.

Goddeau, D. et al., "Galaxy: A Human-Language Interface to On-Line Travel Information," Proc. of ICSLP, 1994.

Russell, M. et al., "Applications of Automatic Speech Recognition to Speech and Language Development in Young Children," Proc. of ICSLP, 1996.

Language Industry Monitor, "Janet Baker's Optimism," 1992.

Gauvain, J.L. et al., "The LIMSI Continuous Speech Dictation System," Proc. ARPA Human Lang. & Technology, 1994.

Gauvain, J.L. et al., "The LIMSI Continuous Speech Dictation System: Evaluation on the ARPA Wall Street Journal Task," Proc. of the IEEE-ICASSP, 1994.

Gauvain, J.L. et al., "Speech Recognition for an Information Kiosk," Proc. of ICSLP, 1996.

Lamel, L.F. et al., "Recent Developments in Spoken Language Systems for Information Retrieval," ESCA ETRW Spoken Dialog Systems, 1995.

Bennacef, S.K., "A Spoken Language System for Information Retrieval," Proc. of ICSLP, 1994.

Gauvain, J.L. et al., "Spoken LanguageComponent of the MASK Kiosk," Human Comfort and Security of Information Systems, 1995.

Arons, B., "Hyperspeech: Navigating in Speech-Only Hypermedia," Proc. of Hypertext, 1991.

Mostow, Jack et al., "Towards a Reading Coach That Listens: Automated Detection of Oral Reading Errors," Proc. of the 11th Ntl. Conf. on A.I., 1993.

House, D., "Spoken-Language Access to Multimedia (SLAM): Masters Thesis," Oregon Graduate Inst., Dept. of CS and Eng., 1995.

Screen Shot of a Civilization Building Game; Available at http://www.s2.com.br/s2arquivos/361/Imagens/2324Image.jpg (accessed Oct. 11, 2005).

Screen Shot of a Civilization Building Game; Available at http://www.s2.com.br/s2arquivos/361/Imagens/2323Image.jpg (accessed Oct. 11, 2005).

Screen Shot of a Flight Simulator; Available at http://orbit.medphys.ucl.ac.uk/images/gallery64.jpg (accessed Oct. 11, 2005).

Screen Shot of a Flight Simulator; Available at http://foto.spullenbank.nl/common/img/00/00/03/31/.sub.—T33178.jpg (accessed Oct. 11, 2005).

Screen Shot of a Role Playing Game; Available at http://images.fok.nl/upload/lotrrotk2.jpg (accessed Oct. 11, 2005).

Screen Shot of a Role Playing Game; Available at http://images.fok.nl/upload/lotrrotk3.jpg (accessed Oct. 11, 2005).

INTERNET.COM, "Graphical User Interface," available at http://www.webopedia.com; accessed Sep. 24, 2004. Last Modified May 17, 2004.

\* cited by examiner

MENU-DRIVEN VOICE CONTROL OF CHARACTERS IN A GAME ENVIRONMENT

CROSS-REFERENCE TO RELATED APPLICATIONS

This application is a continuation and claims the priority benefit of U.S. patent application Ser. No. 09/859,034 filed May 14, 2001 now U.S. Pat. No. 7,085,722 and entitled "System and Method for Menu-Driven Voice Control of Characters in a Game Environment." The disclosure of this commonly owned application is incorporated herein by reference.

BACKGROUND OF THE INVENTION

1. Field of the Invention

This invention relates generally to electronic entertainment devices and relates more particularly to a system and method for menu-driven voice control of characters in a game environment.

2. Description of the Related Art

In electronic entertainment systems such as gaming systems, a user typically interacts with a game program using some type of manually activated controller device. Common controller devices are buttons, joysticks, switches, keyboards, and combinations of these. Some gaming systems use specially designed control devices, such as a steering wheel and pedals for driving simulations and a stick and pedals for flight simulations.

Each gaming system typically uses manually activated controller devices of a single design for most games playable on the system, and buttons or keystrokes are assigned different meanings for each game. In one game, a particular button may correspond to a punch, while in another game the same button corresponds to firing a torpedo. Thus use of a controller device is not very intuitive for the user in the context of a particular game environment.

Use of manually activated controller devices requires a user to memorize which buttons or keys are assigned to particular actions. For complicated games, the number of buttons or combinations of keystrokes can be very large. In many games, a user only controls the actions of a single character. In games when the user controls a group of characters, the characters act as a group, so in effect the group of characters acts as a single character. Allowing the user to control multiple characters independently using manually activated controller devices may be possible, but would be very complex and difficult to learn and use.

SUMMARY OF THE INVENTION

In accordance with the present invention, a system and method are disclosed to implement menu-driven voice control of characters in a game environment. The system of the invention includes game software and a speech recognition module. The speech recognition module is speaker-independent and context sensitive with a vocabulary of available command words or phrases to control actions of a character or characters in the game environment. A user speaks commands from the vocabulary into a microphone to control the actions of a character or characters in the game environment.

In a learning mode, menus of available commands are displayed to the user. A level 1 command menu shows available characters to control. A level 2 command menu shows available actions for a character or characters selected from the level 1 menu. The available actions in the level 2 menu depend upon a current state of the game. A level 3 command menu shows available options for the character actions selected from the level 2 menu. The available options in the level 3 menu may also depend upon a current state of the game.

In a non-learning mode, menus of available commands are not displayed to the user. The user speaks memorized commands in the vocabulary of the speech recognition module. The speech recognition module is context-sensitive; it will not react to a level 2 command unless a level 1 command was previously input, and will not react to a level 3 command unless a level 2 command was previously input. Thus, the user inputs verbal sentence-type commands (actor plus action) to control a character or characters in the game environment.

DETAILED DESCRIPTION

Figure 1:
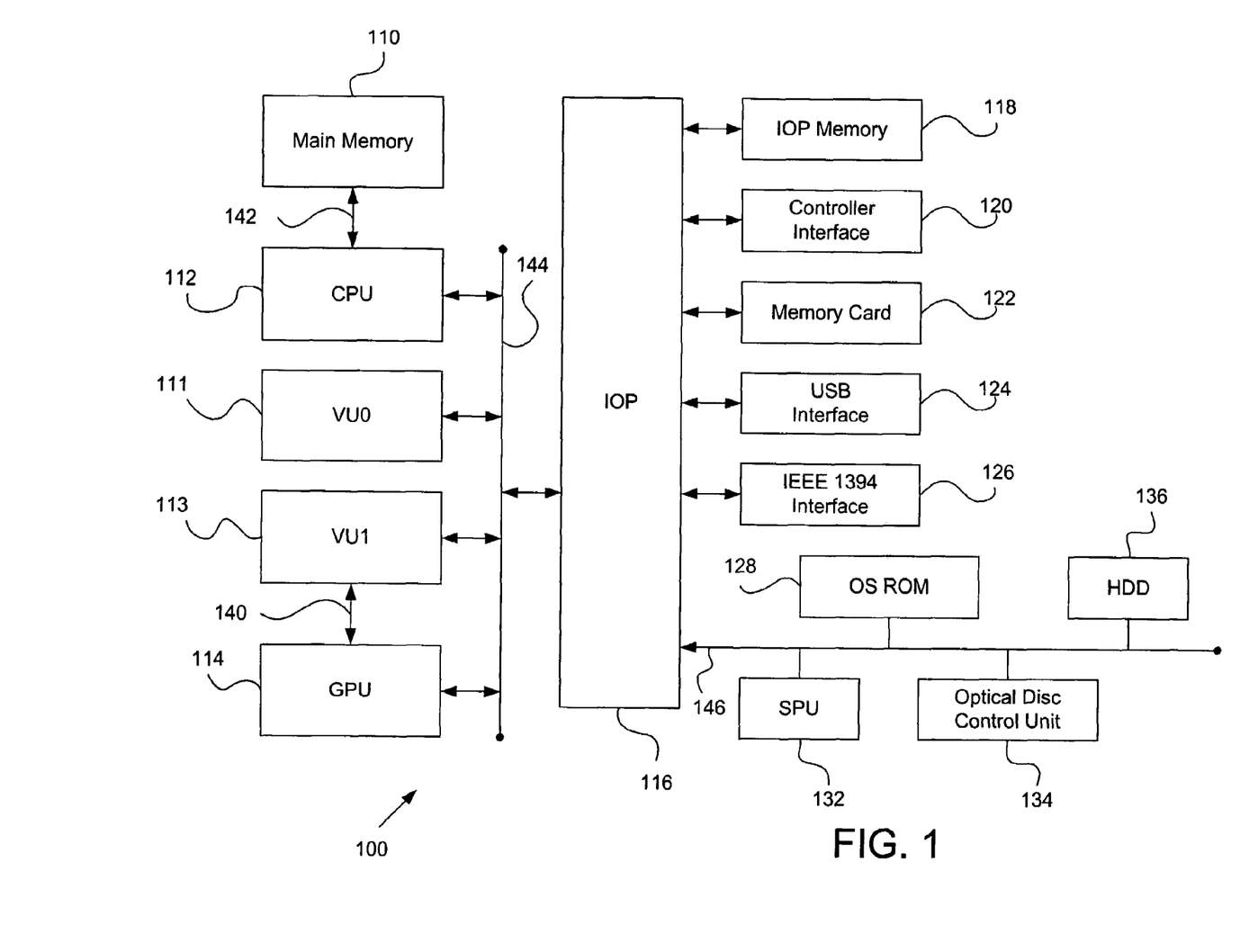
FIG. 1 is a block diagram of one embodiment of an electronic entertainment system, according to the invention.

FIG. 1 is a block diagram of one embodiment of an electronic entertainment system 100 in accordance with the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116. System 100 is preferably an electronic gaming console; however, system 100 may also be implemented as a general-purpose computer, a set-top box, or a hand-held gaming device.

CPU 112, VU0 111, VU1 113, GPU 114, and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain pre-stored programs and may also contain programs transferred via IOP 116 from a CD-ROM, DVD-ROM, or other optical disc (not shown) using optical disc control unit 134. IOP 116 controls data exchanges between CPU 112, VU0 111, VU1 113, GPU 114 and other devices of system 100, such as controller interface 120.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions to produce sound signals that are output on an audio device (not shown).

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126. In the preferred embodiment, a USB microphone (not shown) is connected to USB interface 124 to enable the user to provide voice commands to system 100.

Figure 2:
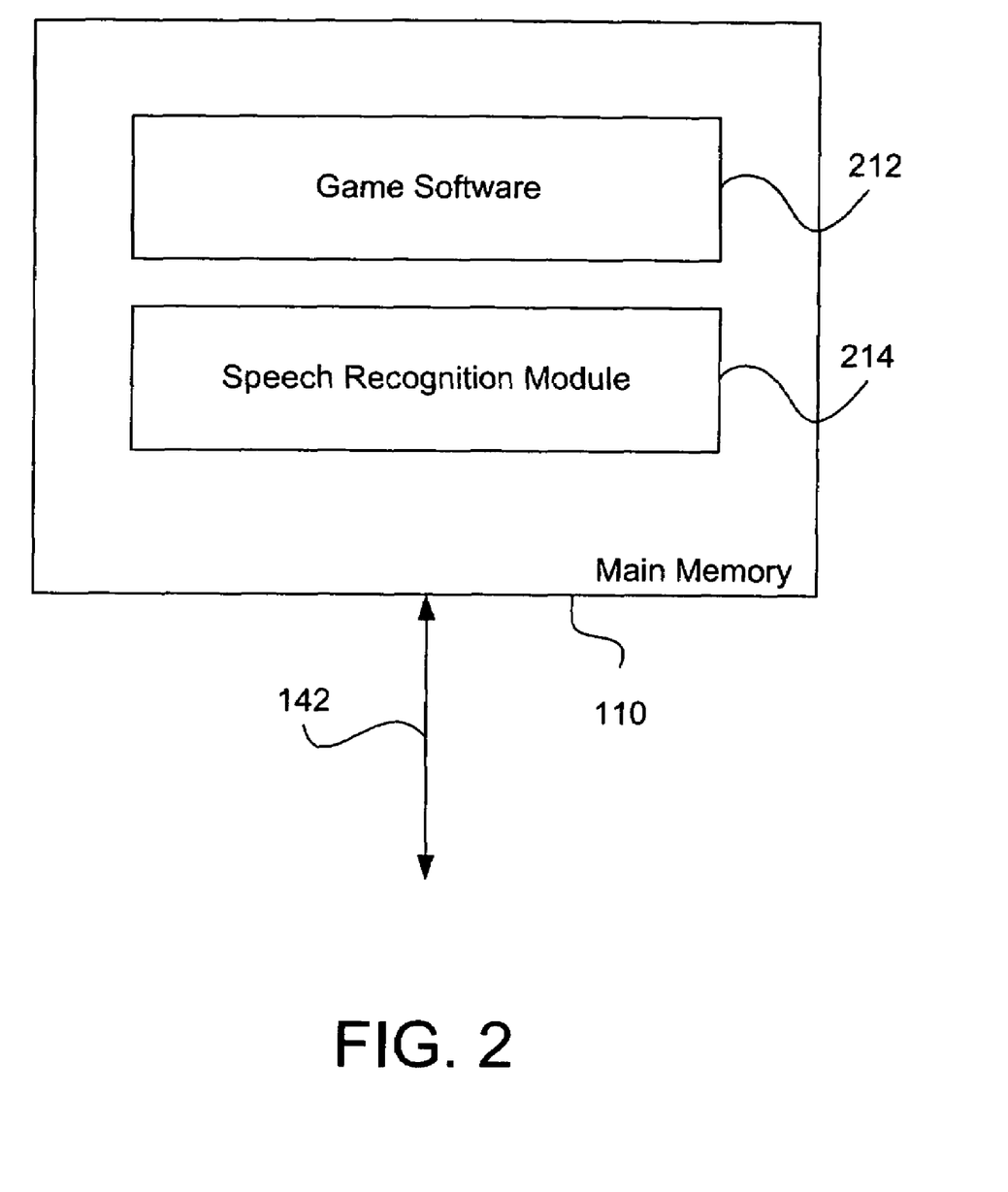
FIG. 2 is a block diagram of one embodiment of the main memory of FIG. 1, according to the invention.

FIG. 2 is a block diagram of one embodiment of main memory 110 of FIG. 1, according to the invention. Main memory 110 includes, but is not limited to, game software 212 and a speech recognition module 214, which were loaded into main memory 110 from an optical disc in optical disc control unit 134. Game software 212 includes instructions executable by CPU 112, VU0 111, VU1 113, and SPU 132 that allow a user of system 100 to play a game. In the FIG. 2 embodiment, game software 212 is a combat simulation game in which the user controls a three-character team of foot soldiers. In other embodiments, game software 212 may be any other type of game, including but not limited to a role-playing game (RPG), a flight simulation game, and a civilization-building simulation game.

Speech recognition module 214 is a speaker-independent, context-sensitive speech recognizer executed by CPU 112. In an alternate embodiment, IOP 116 executes speech recognition module 214. Speech recognition module 214 includes a vocabulary of commands that correspond to instructions in game software 212. The commands include single-word commands and multiple-word commands. When an input speech signal (utterance) matches a command in the vocabulary, speech recognition module 214 notifies game software 212, which then provides appropriate instructions to CPU 112.

The user of system 100 and game software 212 inputs one or more of the commands via the microphone and USB interface 124 to control the actions of characters in game software 212. The spoken commands are preferably used in conjunction with controller commands; however, other embodiments of game software 212 may implement spoken commands only.

Figure 3A:
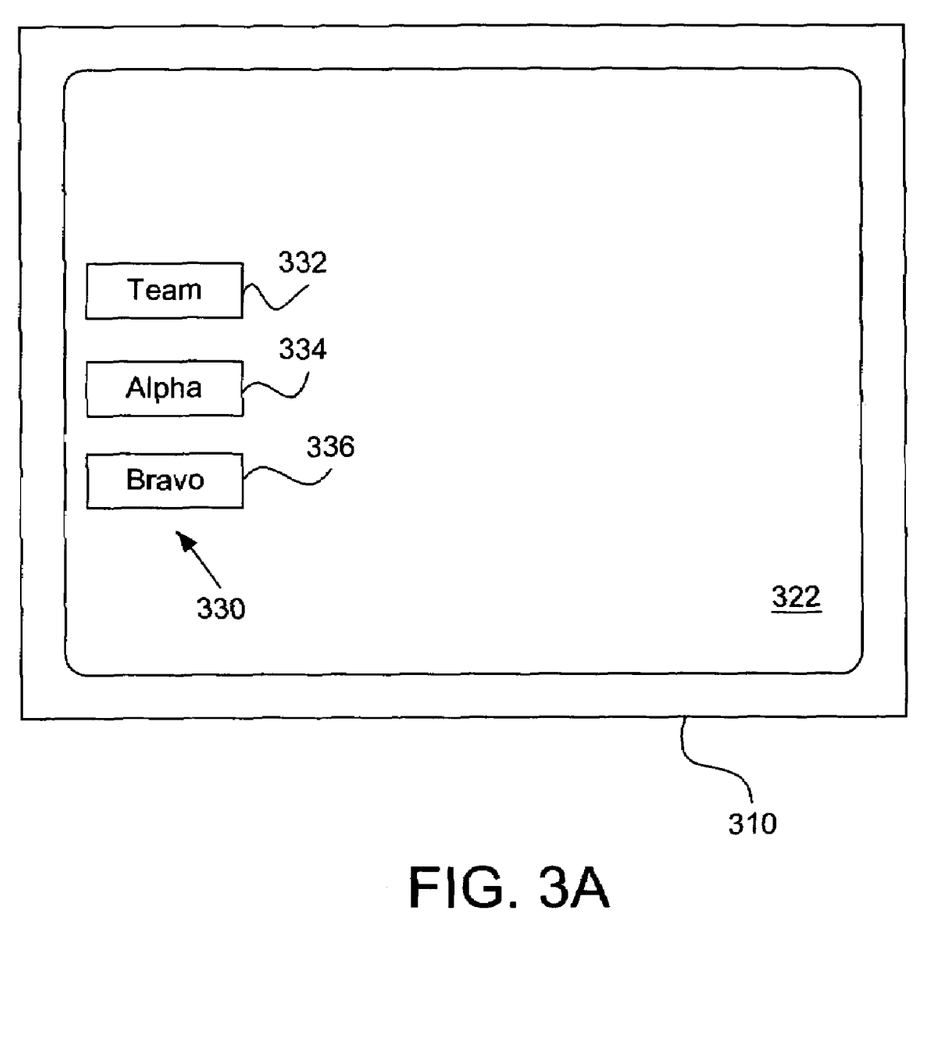
FIG. 3A is a diagram of one embodiment of a level 1 menu command screen on a display device, according to the invention.

FIG. 3A is a diagram of one embodiment of a level 1 menu command screen 322 on a display device 310 connected to system 100, according to the invention. The level 1 menu 330 includes three level 1 command items, a team item 332, an alpha item 334, and a bravo item 336. Although three level 1 command items are shown, game software 212 may use any number of level 1 command items. Level 1 menu command screen 322 appears when the user actuates and then releases a button or other device on the controller dedicated to this function. Level 1 menu command screen 322 also includes a current game picture (not shown) underlying level 1 menu 330. Level 1 menu 330 appears on display device 310 to indicate to the user available choices for level 1 commands.

In the FIG. 2 embodiment of game software 212, the user controls the actions of a team leader character using controller actions such as actuating buttons or manipulating a joystick. The user inputs spoken commands to control the actions of a two-character team. Team item 332 represents the availability of a team command that selects both members of the two-character team to perform an action. Alpha item 334 represents the availability of a command that selects one member, alpha, to perform an action. Bravo item 336 represents the availability of a command that selects one member, bravo, to perform an action.

The user says the word "team" into the microphone to select team item 332, says the word "alpha" to select alpha item 334, and says the word "bravo" to select bravo item 336. When speech recognition module 214 recognizes one of the level 1 commands, it notifies game software 212, which then displays a level 2 menu command screen.

Figure 3B:
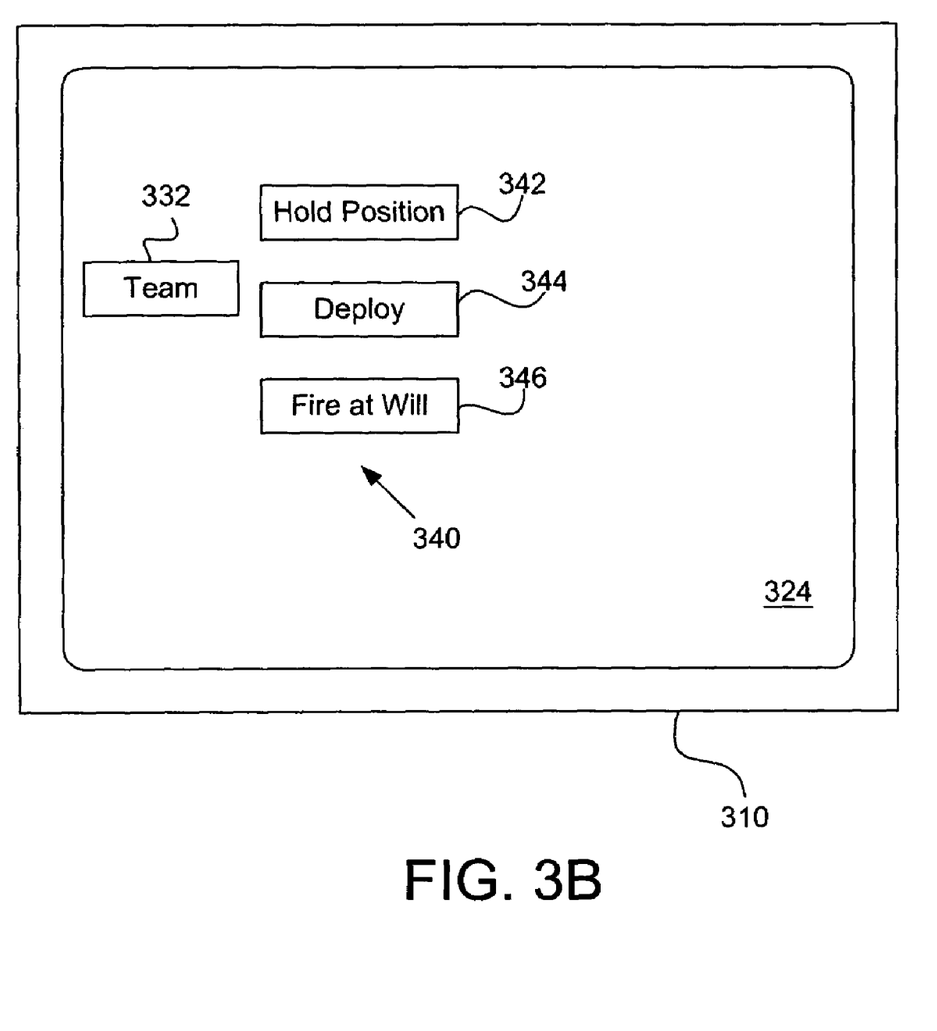
FIG. 3B is a diagram of one embodiment of a level 2 menu command screen on the display device, according to the invention.

FIG. 3B is a diagram of one embodiment of a level 2 menu command screen 324 on the display device 310, according to the invention. In the FIG. 3B embodiment, the user has spoken "team" into the microphone to select team item 332. Level 2 menu command screen 324 shows a level 2 menu 340. Level 2 menu 340 includes the previously selected level 1 command (team item 322) and three level 2 commands: a hold position item 342, a deploy item 344, and a fire at will item 346. Although three level 2 command items are shown, game software 212 may use any number of level 2 command items.

Level 2 menu 340 illustrates available commands for the two-character team. The available commands depend upon a current state of the game. For example, if the user verbally selects hold position item 342, then the two-character team will appear to hold their position in the game environment. The next time that the user verbally selects team item 332, hold position item 342 will not appear but a follow item (not shown) will appear instead.

The combination of team item 332 and hold position item 342 is a complete command, so if the user says "hold position" while screen 324 is displayed, game software 212 then stops displaying screen 324 and causes the selected characters to perform the selected action in the game environment (both members of the team hold their position). Similarly, the combination of team item 332 and fire at will item 346 is a complete command, so if the user says "fire at will" while screen 324 is displayed, game software 212 then stops displaying screen 324 and causes the selected characters to perform the selected action in the game environment (both members of the team fire their weapons). The combination of team item 332 and deploy item 344 is not a complete command. If the user says, "deploy" while screen 324 is displayed, game software 212 then displays a level 3 menu command screen.

Figure 3C:
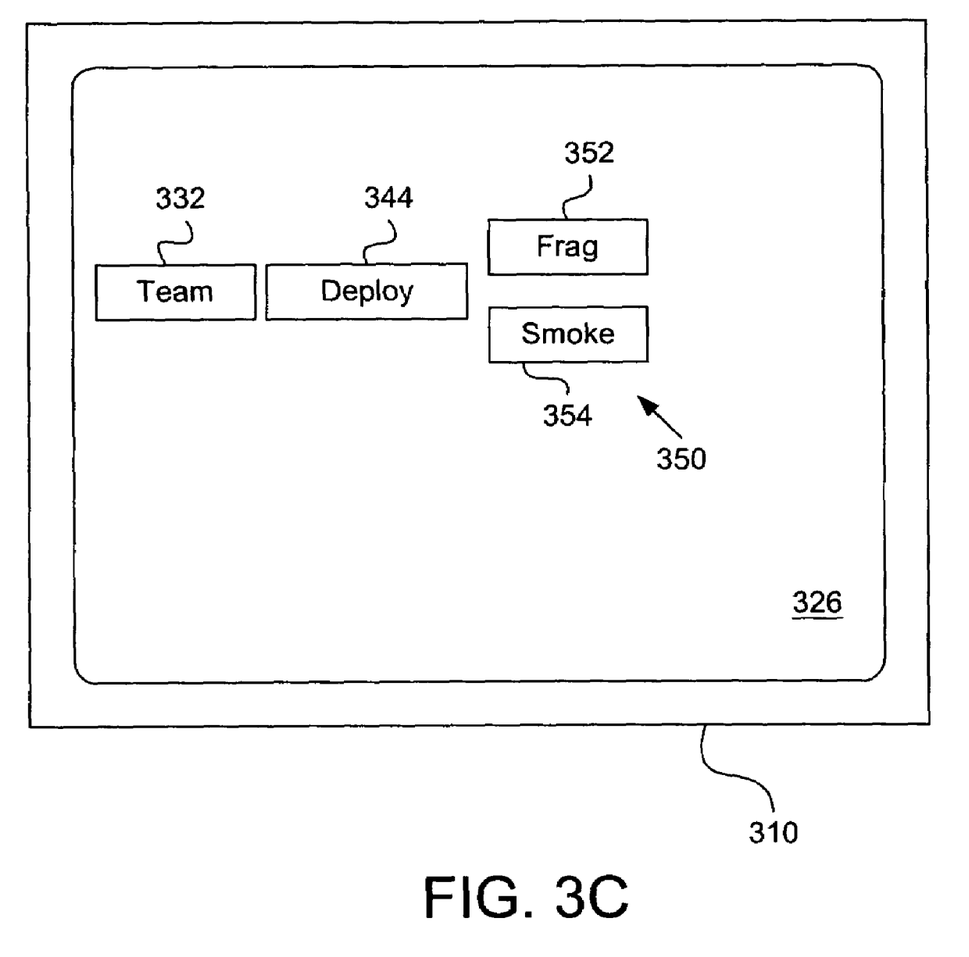
FIG. 3C is a diagram of one embodiment of a level 3 menu command screen on the display device, according to the invention.

FIG. 3C is a diagram of one embodiment of a level 3 menu command screen 326 on the display device 310, according to the invention. Level 3 menu command screen 326 shows a level 3 menu 350 that includes a previously selected level 1 command (team item 332), a previously selected level 2 command (deploy 344) and two level 3 commands: frag item 352 and smoke item 354. In the FIG. 2 embodiment of game software 212, the two-character team of foot soldiers can deploy fragment (frag) grenades and smoke grenades. Although only two level 3 commands are shown, game software 212 may include any number of level 3 commands.

The combination of team item 332, deploy item 344, and frag item 352 is a complete command, so if the user says "frag" while screen 326 is displayed, software module 212 stops displaying screen 326 and causes the selected characters to perform the selected action in the game environment (both members of the team deploy a frag grenade). The combination of team item 332, deploy item 344, and smoke item 354 is a complete command, so if the user says "smoke" while screen 326 is displayed, software module 212 stops displaying screen 326 and causes the selected characters to perform the selected action in the game environment (both members of the team deploy a smoke grenade).

Although in FIG. 3C only three menu levels are shown, any number of menu levels is within the scope of the invention. In the preferred embodiment the number of menu levels is three for ease of use and to facilitate learning of the various command combinations. Once the user has learned or memorized all of the various command combinations, the user may play the game without using the command menus (non-learning mode).

As stated above in conjunction with FIG. 2, speech recognition module 214 is context-sensitive. For example, the word "deploy" is in the vocabulary of speech recognition module 214. However, speech recognition module 214 will only recognize the word "deploy" in the context of a level 1 command such as "team" or "alpha." In other words, speech recognition module 214 will not react to an input level 2 command unless a level 1 command has been input, and will not react to an input level 3 command unless a level 2 command has been input. Thus speech recognition module 212 recognizes sentence-type commands (actor plus action) that game software 212 uses to control actions of the characters in the game environment.

Although FIGS. 3A–3C illustrate command menus 330, 340, and 350 as branching menus that branch from left to right, any other configuration for displaying available commands to the user is within the scope of the invention.

Figure 4:
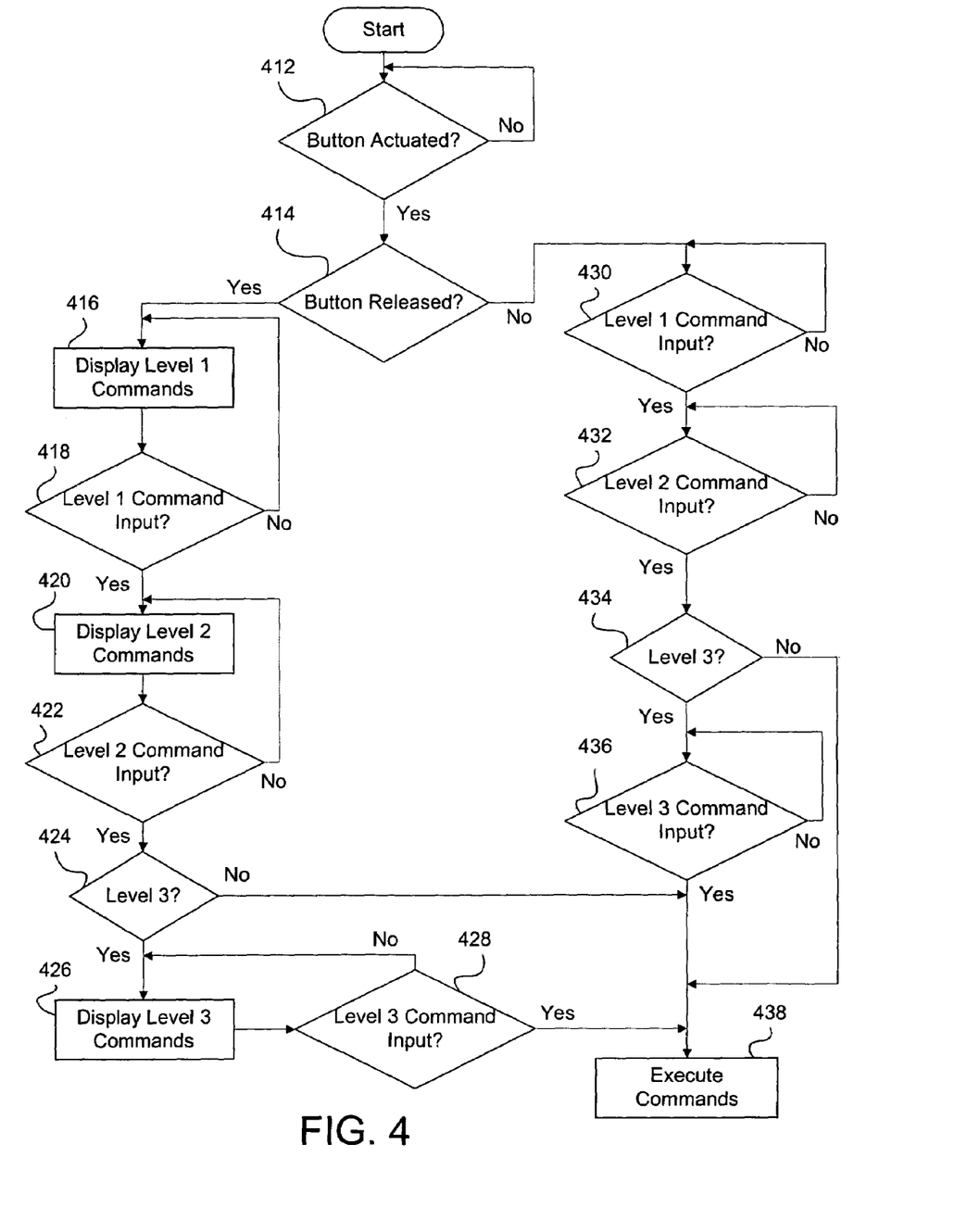
FIG. 4 is a flowchart of method steps for menu-driven voice command of characters, according to one embodiment of the invention.

FIG. 4 is a flowchart of method steps for menu-driven voice command of characters, according to one embodiment of the invention. First, in step 412, game software 212 determines whether the user has actuated a controller button assigned to a voice command functionality. If not, then game software 212 continues monitoring the controller button signals. If the button has been actuated, then in step 414 game software 212 determines whether the button has been released. If the button has been released, the method continues in a learning mode with step 416. If the button has not been released, the method continues in a non-learning mode with step 428.

In step 416, game software 212 displays level 1 commands on a level 1 menu command screen. Then in step 418, speech recognition module 214 determines whether the user has verbally input a level 1 command. If not, the method returns to step 416. If the user has verbally input a level 1 command, then in step 420 game software 212 displays level 2 commands on a level 2 menu command screen. In step 422, speech recognition module 214 determines whether the user has verbally input a level 2 command. If not, the method returns to step 420. If the user has verbally input a level 2 command, the method continues with step 424.

If the input level 2 command does not have associated level 3 commands, then in step 438 game software 212 executes the commands, whereby a character or characters in the game environment perform the selected action. If the input level 2 command does have associated level 3 commands, then in step 426 software module 212 displays level 3 commands on a level 3 menu command screen. In step 428, speech recognition module 214 determines whether the user has verbally input a level 3 command. If not, the method returns to step 426. If the user has verbally input a level 3 command, then in step 438 game software 212 executes the commands, whereby a character or characters in the game environment perform the selected action.

In the non-learning mode, the available commands at each level are not displayed to the user. In step 430, speech recognition module 214 determines if the user has verbally input a level 1 command. If not, speech recognition module 214 continues to listen for a level 1 command. If the user has verbally input a level 1 command, then in step 432 speech recognition module 214 determines whether the user has verbally input a level 2 command. If not, speech recognition module 214 continues to listen for a level 2 command. If the user has input a level 2 command, then the method continues with step 434.

If the input level 2 command does not have associated level 3 commands, then the method continues in step 438 where game software 212 executes the commands, whereby a character or characters in the game environment perform the selected action. If the input level 2 command does have associated level 3 commands, then in step 436 speech recognition module 214 determines whether the user has verbally input a level 3 command. If the user has not verbally input a level 3 command, then speech recognition module 214 continues to listen for a level 3 command. If the user has verbally input a level 3 command, then in step 438 game software 212 executes the commands, whereby a character or characters in the game environment perform the selected action.

In the non-learning mode, the user experiences the game environment as if he or she is actually giving verbal instructions to a character or characters, making the game play more intuitive and realistic. In one embodiment of game software 212, after the user has given a spoken command to one of the characters, a prerecorded acknowledgement of the command or other audible response is played back to the user via a speaker or headset (not shown).

What is claimed is:

1. A method for voice control of at least one character in a visually dynamic and interactive game environment, comprising:

receiving a complete and uninterrupted command from a user, the complete and uninterrupted command comprising a plurality of vocal utterances;

determining whether a first vocal utterance from the plurality of vocal utterances corresponds to a first command item from a first-command level in a vocabulary of command items;

if the first vocal utterance corresponds to a first command item from the first command level in the vocabulary of command items, determining whether the first command item from the first command level is associated with a subsequent command item from a subsequent command level in the vocabulary of command items; and if the first command item from the first command level is associated with a subsequent command item from a subsequent command level in the vocabulary of command items, determining whether a subsequent vocal utterance from the plurality of vocal utterances corresponds to the associated subsequent command item from the subsequent command level in the vocabulary of command items, wherein if the subsequent vocal utterance corresponds to the associated subsequent command item from the subsequent command level in the vocabulary of command items, performing an action that corresponds to the complete and uninterrupted command.

2. The method of claim 1, wherein determining whether the first vocal utterance from the plurality of vocal utterances corresponds to a first command item from a first command level in a vocabulary of command items comprises evaluating a context of the utterance.

3. The method of claim 1, wherein the complete and uninterrupted command comprises an actor and an associated action.

4. The method of claim 1, wherein the complete and uninterrupted command is a sentence-type command.

5. The method of claim 1, wherein at least one vocal utterance from the plurality of vocal utterances comprises at least two words.

6. The method of claim 1, wherein a command item from a command level in the vocabulary of command items is a single-word command.

7. The method of claim 1, wherein a command item from a command level in the vocabulary of command items is a multiple-word command.

8. The method of claim 1, further comprising providing an acknowledgment of the complete and uninterrupted command prior to performing the action that corresponds to the complete and uninterrupted command.

9. The method of claim 1, wherein the complete and uninterrupted command is received in conjunction with at least one command from a controller device.

10. The method of claim 9, wherein the at least one command from the controller device comprises actuation of voice control of the at least one character in the visually dynamic and interactive game environment.

11. The method of claim 9, wherein the action that corresponds to the complete and uninterrupted command is performed in conjunction with an action that corresponds to the at least one command from the controller device.

12. The method of claim 1, further comprising displaying a menu of available subsequent command items from the subsequent command level in the vocabulary of command items.

13. The method of claim 12, wherein the menu of available command items is no longer displayed upon determining that a subsequent vocal utterance from the plurality of vocal utterances corresponds to a subsequent command item from the subsequent command level in the vocabulary of command items.

14. The method of claim 13, wherein the subsequent command item from the subsequent command level in the vocabulary of command items that corresponds to the subsequent vocal utterance from the plurality of vocal utterances continues to be displayed.

15. The method of claim 12, wherein the menu is a branching menu.

16. The method of claim 1, wherein if the subsequent vocal utterance corresponds to the associated subsequent command item from the subsequent command level in the vocabulary of command items, determining whether the subsequent command item from the subsequent command level is associated with another command item from another command level in the vocabulary of command items; and if the subsequent command item from the subsequent command level is associated with another command item from another command level in the vocabulary of command items, determining whether another vocal utterance from the plurality of vocal utterances corresponds to the associated another command item from the another command level in the vocabulary of command items.

17. The method of claim 16, wherein if the another vocal utterance corresponds to the associated another command item from the another command level in the vocabulary of command items, performing an action that corresponds to the complete and uninterrupted command.

18. A machine-readable medium having embodied thereon a program, the program being executable by a machine to perform a method for controlling at least one character in a visually dynamic and interactive game environment, the method comprising:
   receiving a complete and uninterrupted command from a user, the complete and uninterrupted command comprising a plurality of vocal utterances;
   determining whether a first vocal utterance from the plurality of vocal utterances corresponds to a first command item from a first command level in a vocabulary of command items;
   if the first vocal utterance corresponds to a first command item from the first command level in the vocabulary of command items, determining whether the first command item from the first command level is associated with a subsequent command item from a subsequent command level in the vocabulary of command items; and
   if the first command item from the first command level is associated with a subsequent command item from a subsequent command level in the vocabulary of command items, determining whether a subsequent vocal utterance from the plurality of vocal utterances corresponds to the associated subsequent command item from the subsequent command level in the vocabulary of command items, wherein if the subsequent vocal utterance corresponds to the associated subsequent command item from the subsequent command level in the vocabulary of command items, performing an action that corresponds to the complete and uninterrupted command.

19. The machine-readable medium of claim 18, further comprising displaying a menu of available subsequent command items from the subsequent command level in the vocabulary of command items.

20. The method of claim 19, wherein the menu of available command items is no longer displayed upon determining that a subsequent vocal utterance from the plurality of vocal utterances corresponds to a subsequent command item from the subsequent command level in the vocabulary of command items.

21. The method of claim 20, wherein the subsequent command item from the subsequent command level in the vocabulary of command items that corresponds to the subsequent vocal utterance from the plurality of vocal utterances continues to be displayed.

22. A system for controlling at least one character in a visually dynamic and interactive game environment, the system comprising:
   a microphone configured to receive a complete and uninterrupted command from a user, the complete and uninterrupted command comprising a plurality of vocal utterances;
   a speech recognition module coupled to the microphone, the speech recognition module the speech recognition module configured to:
      determine whether a first vocal utterance from the plurality of vocal utterances corresponds to a first command item from a first command level in a vocabulary of command items;
      if the first vocal utterance corresponds to a first command item from the first command level in the vocabulary of command items, determine whether the first command item from the first command level is associated with a subsequent command item from a subsequent command level in the vocabulary of command items;

if the first command item from the first command level is associated with a subsequent command item from a subsequent command level in the vocabulary of command items, determine whether a subsequent vocal utterance from the plurality of vocal utterances corresponds to the associated subsequent command item from the subsequent command level in the vocabulary of command items; and if the subsequent vocal utterance corresponds to the associated subsequent command item from the subsequent command level in the vocabulary of command items, generate a notification for game software corresponding to the visually dynamic and interactive game environment to provide instructions causing the at least one character to perform an action that corresponds to the complete and uninterrupted command.

23. The system of claim 22, further comprising a controller device configured to provide instructions for controlling an action of the at least one character, the action corresponding to the instruction.

24. The system of claim 22, further comprising a graphics processing unit configured to generate a menu of available subsequent command items from the subsequent command level in the vocabulary of command items.

25. The system of claim 24, wherein the menu of available command items is no longer displayed upon determining that a subsequent vocal utterance from the plurality of vocal utterances corresponds to a subsequent command item from the subsequent command level in the vocabulary of command items.

26. The system of claim 25, wherein the subsequent command item from the subsequent command level in the vocabulary of command items that corresponds to the subsequent vocal utterance from the plurality of vocal utterances continues to be displayed.

* * * * *

UNITED STATES PATENT AND TRADEMARK OFFICE
CERTIFICATE OF CORRECTION

PATENT NO. : 7,233,904 B2
APPLICATION NO. : 11/403716
DATED : June 19, 2007
INVENTOR(S) : Seth C. H. Luisi Page 1 of 1

It is certified that error appears in the above-identified patent and that said Letters Patent is hereby corrected as shown below:

On the Title Page Item -73- should read, --Assignee: Sony Computer Entertainment America Inc.--

On the Title Page Item -56- should read, --References Cited: U.S. Patent Application 2002/0068626, published June 6, 2002, by Takeda et al.--

In Claim 20, Column 8, Line 39, that portion of the claim reading "The method of claim 19" should read --The machine-readable medium of claim 19--

In Claim 21, Column 8, Line 45, that portion of the claim reading "The method of claim 20" should read --The machine-readable medium of claim 20--

In Claim 22, Column 8, Line 58, that portion of the claim reading "..the speech recognition module the speech recognition module..." should read --the speech recognition module--

Signed and Sealed this

Twenty Second Day of April, 2008

JON W. DUDAS
*Director of the United States Patent and Trademark Office*